United States Patent [19]

Palomares et al.

[11] Patent Number: 5,314,666
[45] Date of Patent: May 24, 1994

[54] METHOD AND APPARATUS FOR TREATING HYDROCARBON GAS STREAMS CONTAMINATED WITH CARBONYL SULFIDE

[75] Inventors: S. Travis Palomares, Aliso Viejo; Thomas G. Morrison, Placentia, both of Calif.

[73] Assignee: Atlantic Richfield Company, Los Angeles, Calif.

[21] Appl. No.: 15,967

[22] Filed: Feb. 5, 1993

Related U.S. Application Data

[62] Division of Ser. No. 941,509, Sep. 8, 1992, Pat. No. 5,298,228.

[51] Int. Cl.$^5$ .............................................. B01J 8/04
[52] U.S. Cl. ...................................... 422/191; 202/158; 202/183; 203/49; 203/DIG. 6; 261/149; 261/114.2; 422/189; 422/193
[58] Field of Search ......................... 422/191, 189, 193; 261/149, 150, 114.2; 202/158, 183, 185.1; 203/49, DIG. 6

[56] References Cited

U.S. PATENT DOCUMENTS

| | | | |
|---|---|---|---|
| 4,230,533 | 10/1980 | Giroux | 202/158 |
| 4,336,106 | 6/1982 | Winter, III | 202/158 |
| 4,396,463 | 8/1983 | Josis et al. | 202/158 |
| 4,405,449 | 9/1983 | Trager | 202/158 |

Primary Examiner—Timothy M. McMahon
Attorney, Agent, or Firm—Tom F. Pruitt

[57] ABSTRACT

An apparatus for treating hydrocarbon gas containing carbonyl sulfide with hot aqueous absorbent at hydrolysis gas containing carbonyl sulfide hydrolysis of carbonyl sulfide to carbon dioxide and hydrogen sulfide and formation of hydrolysis product gas, and for cooling the hydrolysis product gas with cool absorbent at cooling temperature, comprising (a) a hydrolysis section, (b) a cooling section; (c) a chimney tray positioned between the cooling section and the hydrolysis section; (d) a heater to heat the absorbent to form hot aqueous absorbent at hydrolysis reaction temperature; and, (e) a cooler to cool the absorbent withdrawn from the hydrolysis section to cool absorbent at cooling temperature.

3 Claims, 2 Drawing Sheets

METHOD AND APPARATUS FOR TREATING HYDROCARBON GAS STREAMS CONTAMINATED WITH CARBONYL SULFIDE

This is a division, of U.S. patent application Ser. No. 07/941,509, filed Sep. 8, 1992 now U.S. Pat. No. 5,298,228.

BACKGROUND OF THE INVENTION

1. Field of the Invention

In one aspect, this invention relates to a method for purification of a gaseous hydrocarbon stream contaminated with sulfur compounds. In another aspect, this invention relates to a process for reducing the concentration of carbonyl sulfide in refinery fuel gas. In still another aspect, this invention relates to an apparatus for hydrolysis of carbonyl sulfide to hydrogen sulfide and carbon dioxide.

2. Description of the Related Art

Refinery fuel gases are produced in a variety of thermal and catalytic cracking units, including fluid catalytic crackers, hydrocrackers, delayed cokers and the like. Fuel gases have long been burned in refineries to fire heaters for furnaces, reboilers, and the like.

Such fuel gases may contain a variety of sulfur-containing compounds such as hydrogen sulfide, carbonyl sulfide, dimethyl sulfide, diethylsulfide, carbon disulfide and other sulfides and disulfides, as well as methyl mercaptan, ethyl mercaptan, and other thiols, and other sulfur compounds. Burning of sulfur-containing fuel gas streams is subject to governmental regulation, and it is conventional to use absorbent scrubbing systems to remove a portion of the sulfur contaminants, principally hydrogen sulfide, from fuel gas streams prior to burning to reduce the impact on the environment of such burning.

During 1990, the south Coast Air Quality Management District, an agency in California whose regulations govern, in certain aspects, permissible air emissions by refinery units located in the Los Angeles area basin, passed their Rule 431.1. This Rule has been interpreted to require that, by May, 1993, all fuel gas burned or sold, in areas governed by the Rule, contain no more than 40 PPM total sulfur. Although the requirements of Rule 431.1 have been suspended at Aug., 1992, such Rule indicates the nature of possible regulatory actions mandating ultra-purification of fuel gases.

To achieve such ultra-purification of fuel gases to reduce total sulfur, an existing refinery could seek to increase reduction of hydrogen sulfide in its fuel gas. This would require expending capital to increase its existing hydrogen sulfide scrubbing unit capacity and absorbent flow rates or to add additional scrubbing units; however, such expenditures will rapidly reach practical limits and each incremental reduction of hydrogen sulfide will be significantly more costly and less effective as to alternatives for overall sulfur reduction. Thus, there is a need for refiners to find cost-effective alternatives to reduction of hydrogen sulfide in fuel gas, which alternatives may include processes for reducing the concentration of other sulfur compounds in fuel gas, such as carbonyl sulfide.

The prior art has not anticipated the need for such ultra-purification of refinery fuel gases, the prior art being focused primarily on treatment of gas streams having a relatively high sulfur content. In particular, the prior art does not address treatment of fuel gas streams having relatively low concentrations of carbonyl sulfide.

It is well known in the art, for instance, that the concentration of hydrogen sulfide in a gas stream can be reduced by scrubbing same with a variety of absorbents, of which the amine solutions are most commercially applied because of their effective reactivity with hydrogen sulfide and the relative ease of regenerating and recycling the amine absorbents. Carbonyl sulfide removal by amine solutions is not so straightforward. Carbonyl sulfide found in relatively low concentrations in fuel gas is substantially inert to absorption when conventional sulfur removal technologies are used.

In addition, high concentrations of carbonyl sulfide may cause a reduction in hydrogen sulfide removal efficiency. It has been reported that carbonyl sulfide impacts hydrogen sulfide recovery by reacting with amine absorption agents to form stable, neutral nitrogen compounds which have no capacity for taking up added amounts of hydrogen sulfide and other absorbable compounds.

Use of amine absorbents for carbonyl sulfide removal has been reported, however, with resulting disputes as to their effectiveness for carbonyl sulfide absorption and related loss of amine base strength during processing caused by amine-carbonyl sulfide reactions which cause deactivation of the absorbents by forming reaction byproducts which are difficult to regenerate and recycle or otherwise impact absorbent activity.

U.S. Pat. No. 2,311,342 to Kerns, et al., relates to method for carbonyl sulfide removal using monoethanolamine. U.S. Pat. No. 2,309,871 to Shultz, et al., and U.S. Pat. No. 2,594,311 to Johnson, et al., also relate to the application of monoethanolamine in gas treatment for carbonyl sulfide removal. U.S. Pat. No. 2,713,077 to Reive relates to removal of carbonyl sulfide from hydrocarbon streams by ion exchange methods. U.S. Pat. No. 2,726,992 to Easthagen, et al., relates to application of diethanolamine a carbonyl sulfide absorbent. U.S. Pat. No. 3,098,705 to Bally relates to the use of di(isopropanol)amine in carbonyl sulfide extraction. U.S. Pat. No. 3,387,917 to Walles, et al., relates to the extraction of carbonyl sulfide by use of a mixture containing 3-morpholinone compound or an N-alkyl-3-morpholinone compound and an alkanolamine.

U.S. Pat. No. 3,962,015 to Dailey relates to processing of natural gas streams where amine absorbents, including monoethanolamine, diethanolamine and triethanolamine, are used as aqueous based absorbents for carbon dioxide and hydrogen sulfide, where the gas is passed through a low temperature mass absorption zone, a high temperature reaction-absorption zone where carbonyl sulfide in the natural gas is reacted to form hydrogen sulfide and carbon dioxide, and a final low temperature absorption zone, as described in such patent.

Pearce, et al., in "Studies Show Carbonyl Sulfide Problem", Hydrocarbon Processing & Petroleum Refiner, Aug., 1961, pp. 121-126 reported study results which indicated that monoethanolamine is deactivated by carbonyl sulfide and that diethanolamine is not deactivated by carbonyl sulfide, and reported that carbonyl sulfide hydrolysis to hydrogen sulfide and carbon dioxide, with subsequent reaction with hot potassium carbonate as the absorbent, was the only means of carbonyl sulfide removal for a hot carbonate system.

Unlike natural gas streams which generally have a relatively high carbonyl sulfide content, refinery generated fuel gases, which may be required by regulation to be ultra-purified, may contain relatively low quantities of carbonyl sulfide.

Thus, there is a need for a method of, and an apparatus for, purifying fuel gas streams by reducing the concentration of carbonyl sulfide in such streams, especially when such gas streams already have a relatively low concentration of carbonyl sulfide. In addition, there is a need for a carbonyl sulfide removal process effective with relatively low fuel gas stream flowrate and relatively low content of hydrogen sulfide and carbon dioxide.

SUMMARY OF THE INVENTION

We have discovered a novel method for purification of sulfur contaminated gas streams. We have discovered how to achieve contact of fuel gas, contaminated with relatively low concentrations of carbonyl sulfide, with an aqueous solution comprising absorbent in a manner and for a time sufficient to convert carbonyl sulfide to hydrogen sulfide and carbon dioxide. We have also found that an aqueous amine solution-fuel gas contactor, having in the hydrolysis section an unusually large diameter, tall weirs and mechanical gas-to-absorbent contactors on large diameter trays, is effective to reduce the concentration of carbonyl sulfide in refinery fuel gas by enhancing the gas-to-absorbent contact and improving the hydrolysis of the carbonyl sulfide in the fuel gas.

One embodiment of this invention is a method of reducing the concentration of carbonyl sulfide in a hydrocarbon gas containing carbonyl sulfide which comprises (a) feeding the hydrocarbon gas containing carbonyl sulfide to a hydrolysis section to contact, under pressure, for the duration of a contact period, the hydrocarbon gas with hot aqueous absorbent at a reaction temperature to heat the hydrocarbon gas to form hydrolysis section effluent absorbent and hydrolysis section effluent gas containing carbon dioxide and hydrogen sulfide and having a lower concentration of carbonyl sulfide than the hydrocarbon gas; (b) withdrawing and cooling the hydrolysis section effluent absorbent to form a cool aqueous absorbent having a temperature less than the reaction temperature; (c) cooling the hydrolysis section effluent gas in a cooling section by contacting the hydrolysis section effluent gas with the cool aqueous absorbent to form warm aqueous absorbent and a cooling section effluent gas containing hydrogen sulfide and carbon dioxide; (d) heating the warm aqueous absorbent to form hot aqueous absorbent having a temperature of the reaction temperature; (e) feeding the hot aqueous absorbent to the hydrolysis section; and, (f) recovering the cooling section effluent gas as product. The term "aqueous absorbent", as used in the Specification and Claims, means a solution, mixture or suspension of absorbent and water, which may also contain minor amounts of additives (such as antifoaming agents, corrosion inhibitors and the like).

Absorption of hydrogen sulfide is not effective at elevated temperatures, and the cooling section effluent gas will contain hydrogen sulfide which is a product of the carbonyl sulfide hydrolysis. The cooling section effluent gas can be passed to another absorption tower, having adequate capacity, for absorption of the hydrogen sulfide.

In one embodiment of this invention, the cooling section effluent gas is further treated and recovered as product by cooling such gas to a temperature sufficiently cool to permit absorption of hydrogen sulfide and carbon dioxide by absorbent and removing at least a portion of the hydrogen sulfide and carbon dioxide from such gas. Preferably, lean aqueous absorbent having a concentration of hydrogen sulfide or carbon dioxide less than the cool aqueous absorbent is added to the cooling section to form a mixture of lean aqueous absorbent and cool aqueous absorbent and the hydrolysis section effluent gas is cooled and contacted by the mixture to remove at least a portion of the carbon dioxide and hydrogen sulfide contained in the hydrolysis section effluent gas, or more preferably, the lean aqueous absorbent has a temperature less than the temperature of the cool aqueous absorbent. In another variation, the lean aqueous absorbent having a concentration of hydrogen sulfide or carbon dioxide less than the cool aqueous absorbent is contacted with the cooling section effluent gas in an absorption section above the cooling section to remove at least a portion of the carbon dioxide and hydrogen sulfide contained in the cooling section effluent gas and to form enriched lean aqueous absorbent which is passed from the absorption section to the cooling section wherein the enriched lean aqueous absorbent is admixed with the cool aqueous absorbent to form an absorbent mixture which is contacted with the hydrolysis section effluent gas to remove at least a portion of the carbon dioxide and hydrogen sulfide contained in the hydrolysis section effluent gas, or more preferably, the lean aqueous absorbent has a temperature less than the temperature of the cool aqueous absorbent.

In another embodiment of this invention, a method of reducing the concentration of carbonyl sulfide in a hydrocarbon gas stream containing carbonyl sulfide comprises (a) feeding the hydrocarbon gas containing carbonyl sulfide to a hydrolysis section to contact, for the duration of a contact period, the hydrocarbon gas with hot aqueous absorbent at a reaction temperature to heat the hydrocarbon gas to form hydrolysis section effluent absorbent and hydrolysis section effluent gas containing carbon dioxide and hydrogen sulfide and having a lower concentration of carbonyl sulfide than the hydrocarbon gas; (b) withdrawing and cooling the hydrolysis section effluent aqueous absorbent to form cool aqueous absorbent having a temperature less than the reaction temperature; (c) feeding lean aqueous absorbent having a concentration of hydrogen sulfide or carbon dioxide less than the cool aqueous absorbent to an absorption section; (d) cooling the hydrolysis section effluent gas in a cooling section below the absorption section and above the hydrolysis section by contacting the hydrolysis section effluent gas with a mixture of the lean aqueous absorbent and the cool aqueous absorbent to form warm aqueous absorbent and a cooling section effluent gas containing carbon dioxide and hydrogen sulfide; (e) withdrawing and heating the warm absorbent to form hot aqueous absorbent having a temperature of the reaction temperature; (f) feeding the hot aqueous absorbent to the hydrolysis section; and (g) passing the cooling section effluent gas to the absorption section in contact with the lean aqueous absorbent to remove at least a portion of the hydrogen sulfide and carbon dioxide from the cooling section effluent gas to form a product gas. Preferably, the temperature of the lean aqueous absorbent is in the range of 100° F. to 120° F.

In practice of all of the above preferred embodiments of this invention, the duration of the contact period is from about 35 seconds to about 75 seconds. Preferably, the reaction temperature of the hot aqueous absorbent is in the range of about 180° F. to about 210° F., and more preferably, the cool aqueous absorbent is so formed to have a temperature in the range of about 100° F. to about 120° F. and, in the alternative, or concurrently, the cooling section effluent gas is so formed to have a temperature in the range of about 130° F. to about 140° F. Also, it is preferable that the warm aqueous absorbent is so formed to have a temperature in the range of about 165° F. to about 185° F. in a more preferred variations, and, alternatively, the warm aqueous absorbent is withdrawn from the cooling section before heating in a still more preferred variation of the preferred embodiments. It is preferred that the hydrolysis section be maintained at a pressure of about 50 to about 100 psia, and, in the alternative, or concurrently, that the cooling section be maintained at a pressure of about 80 to about 100 psia. In still another variation of the preferred embodiments, the hydrolysis section effluent absorbent is withdrawn from the hydrolysis section at a temperature in the range of about 125° F. to about 145° F. In one variation, the hot aqueous absorbent is adjusted to maintain about 20 to about 30 parts by weight absorbent per 100 parts by weight total water and absorbent. The hot aqueous absorbent is preferably adjusted by adding lean aqueous absorbent having a concentration of water or absorbent different from the hot aqueous absorbent, or in the alternative, or concurrently, the hot aqueous absorbent is adjusted by withdrawing aqueous absorbent from the hydrolysis section and before the cooling of the hydrolysis section effluent absorbent.

Also, preferably, lean aqueous absorbent solution strength is adjusted to maintain about 20 to about 30 parts by weight absorbent per 100 parts by weight total water and absorbent. Those skilled in the art understand that aqueous absorbent solution strength may be adjusted for different absorbents and different conditions. For example, where diethanolamine is employed, preferably about 23 to about 30 parts by weight diethanolamine is employed, with the remaining portion of the solution being principally water. Where monethanolamine is employed as absorbent, the concentration of absorbent can be reduced, as compared with a diethanolamine solution.

In practice of the preferred embodiments of this invention, the absorbent comprises an amine, although other aqueous absorbents are useful. Examples of preferred aqueous absorbents are selected from the group consisting of monoethanolamine, diethanolamine, triethanolamine, di(isopropanol)amine and other alkanolamines, and mixtures thereof.

Preferably, the hydrocarbon gas is ascending through the hydrolysis section and the hot aqueous absorbent is descending through the hydrolysis section. In another variation of this embodiment of this invention, the hydrolysis section effluent gas is ascending through the cooling section and the cool aqueous absorbent is descending through the cooling section.

The hydrocarbon gas containing carbonyl sulfide treated by the preferred embodiments of this invention may be an effluent gas from an absorption process wherein at least a portion of carbon dioxide or hydrogen sulfide has been removed during the absorption process to form the hydrocarbon gas containing carbonyl sulfide. In particular, this invention is effective for treatment of hydrocarbon gas which contains less than about 200 parts per million by weight carbonyl sulfide, and can be effective for treatment of a hydrocarbon gas which is a refinery fuel gas comprising less than about 60 parts per million by weight carbonyl sulfide.

In another embodiment of this invention, an apparatus, for treating hydrocarbon gas containing carbonyl sulfide with hot aqueous absorbent at hydrolysis reaction temperature for hydrolysis of carbonyl sulfide to carbon dioxide and hydrogen sulfide and formation of hydrolysis product gas, and for cooling the hydrolysis product gas with cool absorbent at cooling temperature, comprises (a) a hydrolysis section, comprising a hydrolysis column having an upper and lower zone and a plurality of trays within the hydrolysis column, the trays comprising gas-to-absorbent contactors, weirs, and absorbent downcomers, a hydrocarbon gas feed means positioned in the lower zone of the hydrolysis column, a hot aqueous absorbent feed means positioned in the upper zone of the hydrolysis column, and a withdrawal means to withdraw absorbent from the lower zone of the hydrolysis column; (b) a cooling section, positioned above the hydrolysis section, comprising a cooling column having an upper and lower zone and a plurality of trays within the cooling column, the trays comprising gas-to-absorbent contactors, weirs, and absorbent downcomers, a cool absorbent feed means positioned in the upper zone of the cooling column, and a cool product gas withdrawal means positioned in the upper zone of the cooling column; (c) a chimney tray positioned below the lower zone of the cooling section and above the upper zone of the hydrolysis section, the chimney tray comprising a pan base adapted to collect absorbent from the lower zone of the cooling column, a chimney riser adapted to pass hydrolysis product gas from the top zone of the hydrolysis column to the lower zone of the cooling column without passing the hydrolysis product gas through the absorbent on the pan base, and a withdrawal means adapted to withdraw absorbent from the pan base; (d) a heating means to heat the absorbent withdrawn from the pan base to hot aqueous absorbent at hydrolysis reaction temperature; and, (e) a cooling means to cool the absorbent withdrawn from the hydrolysis section to cool absorbent at cooling temperature. The chimney tray allows hydrolysis section product gas to pass to the cooling section without allowing absorbent in the cooling section to pass directly to the hydrolysis section.

In a still further embodiment of this invention, an apparatus, for treating hydrocarbon gas containing carbonyl sulfide with hot aqueous absorbent at hydrolysis reaction temperature for hydrolysis of carbonyl sulfide to carbon dioxide and hydrogen sulfide and formation of hydrolysis product gas, for cooling the hydrolysis product gas with cool absorbent at cooling temperature, and for product gas recovery by absorption of hydrogen sulfide and carbon dioxide from the cool hydrolysis product gas with lean absorbent at absorption temperature comprises (a) a hydrolysis section, comprising a hydrolysis column having an upper and lower zone and a plurality of trays within the hydrolysis column, the trays comprising gas-to-absorbent contactors, weirs, and absorbent downcomers, a hydrocarbon gas feed means positioned in the lower zone of the hydrolysis column, a hot aqueous absorbent feed means positioned in the upper zone of the hydrolysis column, and a withdrawal means to withdraw absorbent from the lower zone of the hydrolysis column; (b) a cooling section, positioned above the hydrolysis section, comprising a cooling column having an upper and lower zone and a plurality of trays within the cooling column, the trays comprising gas-to-absorbent contactors, weirs, and absorbent downcomers, a cool absorbent feed means positioned in the upper zone of the cooling column; (c) a chimney tray positioned below the lower zone of the cooling section and above the upper zone of the hydrolysis section, the chimney tray comprising a pan base adapted to collect absorbent from the lower zone of the cooling column, a chimney riser adapted to pass hydrolysis product gas from the top zone of the hydrolysis column to the lower zone of the cooling column without passing the hydrolysis product gas through the absorbent on the pan base, and a withdrawal means adapted to withdraw absorbent from the pan base; (d) an absorption section, positioned above the cooling section, comprising an absorption column having an upper and lower zone and a plurality of trays within the absorption column, the trays comprising gas-to-absorbent contactors, weirs and absorbent downcomers, a lean absorbent feed means positioned in the upper zone of the absorption column and a product gas withdrawal means positioned in the upper zone of the absorption column; (e) a heating means to heat the absorbent withdrawn from the pan base to hot aqueous absorbent at hydrolysis reaction temperature; and, (f) a cooling means to cool the absorbent withdrawn from the hydrolysis section to cool absorbent at cooling temperature.

In another embodiment of this invention, an apparatus for treating hydrocarbon gas containing carbonyl sulfide to reduce the concentration of carbonyl sulfide in the hydrocarbon gas comprises (a) a hydrolysis section, for contacting the hydrocarbon gas with hot aqueous absorbent, comprising a column and plurality of trays with the column, the trays comprising vapor-to-liquid contactors to contact and heat ascending hydrocarbon gas with descending hot aqueous absorbent for a contact period in the range of about 35 to about 75 seconds and at a reaction temperature in the range of about 180° F. to about 210° F. to form ascending hydrolysis section effluent gas and descending hydrolysis section effluent absorbent; (b) a feed means for feeding the hydrocarbon gas to the hydrolysis section at a pressure in the range of about 50 to about 100 psia and at a temperature in the range of about 100° F. to about 120° F.; (c) a cooling section, positioned above the hydrolysis section, for contacting the hydrolysis section effluent gas with cool aqueous absorbent, comprising a column and a plurality of trays within the column, the trays comprising vapor-to-liquid contactors to contact and cool ascending hydrolysis section effluent gas with descending cool aqueous absorbent to form warm absorbent and cooling section effluent gas; (d) a chimney tray positioned below the cooling section and above the hydrolysis section, the chimney tray comprising a pan base adapted to collect warm absorbent, a chimney riser adapted to pass hydrolysis section effluent gas from the hydrolysis section to the cooling section without passing the hydrolysis section effluent gas through the warm absorbent on the pan base, and a withdrawal means adapted to withdraw warm absorbent from the pan base; (e) a heating means to heat the withdrawn warm absorbent to form hot absorbent; (f) a conduit means to direct the hot absorbent to the hydrolysis section; (g) a cooling means to cool the hydrolysis section effluent absorbent to form cool aqueous absorbent; (h) a conduit means to direct the cool aqueous absorbent to the cooling section; (i) an absorption section, positioned above the cooling section, for contacting cooling section effluent gas with lean absorbent, comprising a column and a plurality of trays within the column, the trays comprising vapor-to-liquid contactor to contact ascending cooling section gas with descending lean absorbent to pass the lean absorbent to the cooling section and to form a product gas; and, (j) withdrawal means for withdrawing the product gas from the absorption section.

DESCRIPTION OF THE PREFERRED EMBODIMENTS

This invention is illustrated with reference to the drawings wherein, for purposes of illustration of the preferred embodiments, it being understood that this invention is not limited thereto.

Figure 1:
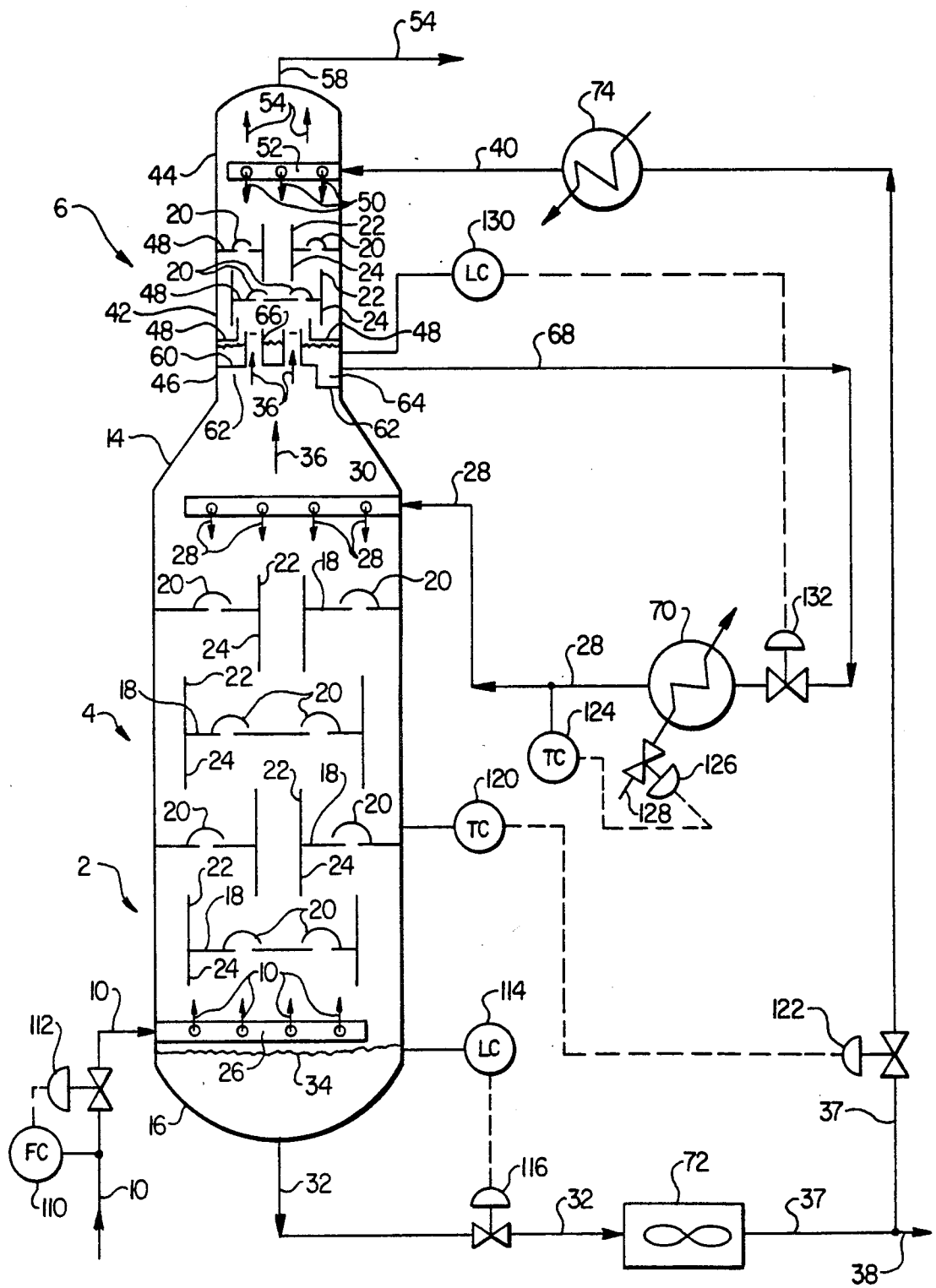
FIG. 1 is a schematic representation of one embodiment of a method and apparatus of this invention for gas treatment to reduce the concentration of carbonyl sulfide by hydrolysis of carbonyl sulfide to form carbon dioxide and hydrogen sulfide and cooling the hydrolysis product.

FIG. 1 is a schematic representation of one variation of one embodiment of an apparatus of this invention for treating a hydrocarbon gas 10 feed stream containing carbonyl sulfide. The apparatus 2 comprises an hydrolysis section 4 and a cooling section 6. In the hydrolysis section 4, hydrocarbon gas 10 containing carbonyl sulfide is contacted with hot aqueous absorbent 28 at hydrolysis reaction temperature for hydrolysis of carbonyl sulfide to carbon dioxide and hydrogen sulfide and formation of hydrolysis product gas 36, which is the hydrolysis section effluent gas. In the cooling section 6, hydrolysis product gas 36 is cooled with cool absorbent 50 at a desired cooling temperature to form cooling section effluent gas 54 having a lower concentration of carbonyl sulfide and hydrogen sulfide than the hydrocarbon gas feed 10.

The hydrolysis section 4 comprises a hydrolysis column 12 having an upper zone 14 and lower zone 16 and a plurality of trays 18 within the hydrolysis column 12. The trays comprise gas-to-absorbent contactors 20 (shown only as one or two per tray) such as bubble caps, valve tray valves, and the like, and the trays preferably comprise perforations to permit passage of ascending gas upward through the trays and through or by the contactors. The trays also comprise weirs 22 which form a dam to support maintaining a level of liquid aqueous absorbent on such trays, and absorbent downcomers 24 to direct descending absorbent to the tray or section below each tray. Two pass trays are shown for purposes of illustration, and those skilled in the art understand that single-pass or multi-pass trays may be used.

The duration of the contact period for contact of hot absorbent 28 in the hydrolysis column 12 with gas 10 for hydrolysis is, as stated above, preferably in the range of about 35 to about 75 seconds. To achieve this preferred contact time and related gas-to-absorbent contact for the hydrolysis reaction, the diameter of the trays 18 for holding absorbent 28 in the hydrolysis column 12 should be sufficiently large, and the weir 22 height also sufficiently tall. Hydrolysis column 12 and diameter of trays 18 and weir 22 height are readily fixed and calculated based upon contact time and flow of hydrocarbon gas 10.

A hydrocarbon gas 10 feed means 26 is positioned in the lower zone 16 of the hydrolysis column 12 and a hot aqueous absorbent 28 feed means 30 is positioned in the upper zone 14 of the hydrolysis column 12. A withdrawal means 32, such as a gravity fed conduit or a pump (not shown), withdraws the hydrolysis section 4 effluent absorbent 34 from the lower zone 16 of the hydrolysis column 12. The hydrolysis section 4 effluent absorbent 34 withdrawn via means 32 is cooled in cooler 72 to form cool absorbent stream 37, which is further cooled in cooler 74 to form cool absorbent stream 40, or at least a portion of such hydrolysis section 4 effluent absorbent 34 may be withdrawn from the apparatus 2 via conduit 38. Two coolers 72 and 74 are shown for purposes of illustration; however, only one cooler or more than two coolers may be used.

The cooling section 6 is positioned above the hydrolysis section 4. The cooling section 6 comprises a cooling column 42 having an upper zone 44 and lower zone 46 and a plurality of trays 48 within the cooling column 42. The trays 48 comprise gas-to-absorbent contactors 20, weirs 22, and absorbent downcomers 24, as described for the hydrolysis section 4. Cooling section 6 trays 48 configuration may be similar or may be dissimilar to that of the hydrolysis section 4 trays 18, which configurations of trays 18 and 48 will depend on apparatus 2 gas 10 loading, as will be appreciated and understood by those skilled in the art. Preferably, the weirs 22 in the cooling section 6 and hydrolysis section 4 will have different heights.

Cool absorbent 40 is fed as a cooling absorbent stream 50 via feed means 52 which is positioned in the upper zone 44 of the cooling column 42 to cool hydrolysis zone 4 effluent gas 36 to form cooling section 6 effluent gas 54. Ascending hydrolysis section 4 effluent gas 36 is contacted by cool absorbent 50 to form warm aqueous absorbent 64. Cooling means 72 and 74 are used to cool the hydrolysis section 4 effluent absorbent 34 withdrawn from the hydrolysis section 4 to form cool aqueous absorbent 40 at cooling temperature which is fed as cooling absorbent stream 50 via feed means 52 to the cooling section 6.

A chimney tray 60 is positioned below the lower zone 46 of the cooling section 42 and above the upper zone 14 of the hydrolysis section 4. The chimney tray 60 comprises a pan base 62 adapted to collect warm absorbent 64 from the lower zone 46 of the cooling column 42. The chimney tray 60 also comprises a chimney riser 66 adapted to pass hydrolysis product gas 36 from the top zone 14 of the hydrolysis column 12 to the lower zone 46 of the cooling column 42 without passing the hydrolysis product gas 36 through the absorbent 64 on the pan base. The cooling section 6 pan tray 62 also comprises a withdrawal means 68, such as a gravity fed conduit or a pump (not shown), adapted to withdraw absorbent 64 from the chimney tray 60 pan base 62.

A heating means 70, such as a heat exchanger with steam or hot fluid as the heating medium 128, is preferably used to heat the warm absorbent 64 withdrawn via means 68 from the pan base 62 to form hot aqueous absorbent 28 at hydrolysis reaction temperature. The hot absorbent 28 is then fed to the hydrolysis column 12, and is preferably fed to the top section zone 14 of such hydrolysis column 12.

FIG. 1 also illustrates one variation of one control embodiment of a hydrolysis and cooling method of this invention. Flow control device 110 controls via control valve 112 the rate of flow of hydrocarbon gas 10 to the hydrolysis section 4 and provides a means of controlling pressure in the hydrolysis column 12 or cooling column 6, or both. Level control device 114 controls via 116 the rate of flow of hydrolysis section 4 effluent absorbent 34 in withdrawal means 32. Level control device 114 can be set to maintain a level of liquid absorbent in the hydrolysis column 12 either below all of the trays 18 or on or above one or more of the trays 18 if flooding of the hydrolysis column 12 is desirable under certain conditions to increase gas 10 and liquids 28 and 34 contact. Temperature control device 120 senses the temperature of the hydrolysis column 12 and adjusts via valve 122 the rate of flow of absorbent 37 from cooler 72 to cooler 74. Temperature control device 124 senses the temperature of the hot aqueous absorbent 28 and adjusts control valve 126 to adjust rate of flow of heating medium 128 to heater 70. Level control device 130 senses the level of warm absorbent 64 on the chimney tray 60 pan base 62, and controls such level by adjusting the rate of flow of warm absorbent 64 in withdrawal means 68 via control valve 132.

Figure 2:
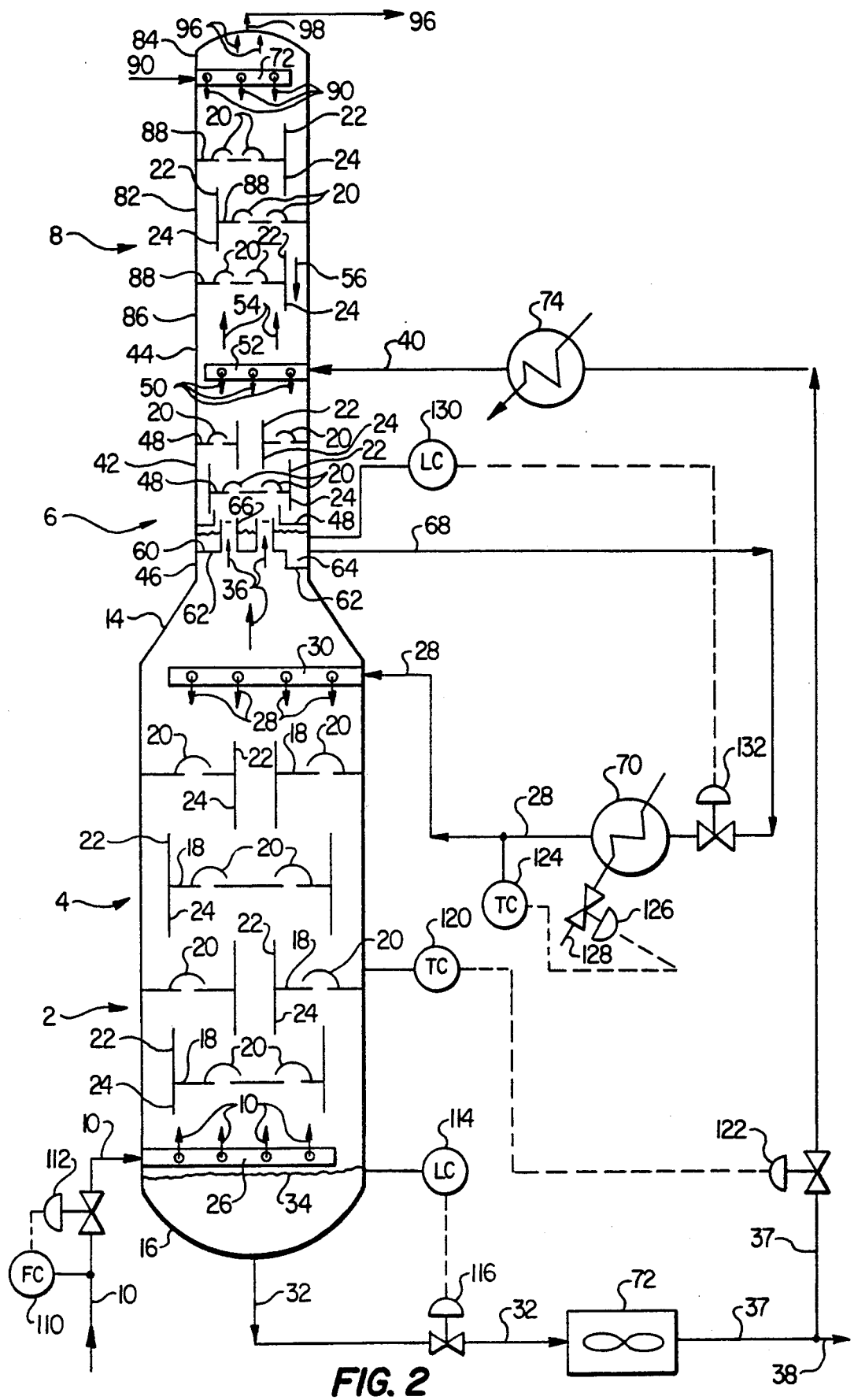
FIG. 2 is a schematic representation of another embodiment of this invention comprising an absorption means used to treat hydrolyzed, and subsequently cooled, process gases for sulfur contaminate elimination.

FIG. 2 is a schematic representation of one variation of another embodiment of an apparatus of this invention for treating a hydrocarbon gas 10 feed stream containing carbonyl sulfide. In the discussion and illustration of FIG. 2, the same numbers as used in FIG. 1 are used in FIG. 2 to refer to the same or similar items. As such enumerated items are discussed and described with respect to FIG. 2, further discussion is unnecessary for understanding FIG. 2.

The apparatus 2 comprises an hydrolysis section 4, a cooling section 6, and an absorption section 8. In the absorption section 8, a product gas 96 is recovered by absorption of hydrogen sulfide and carbon dioxide from the cooled hydrolysis product gas 54 formed as cooling section 6 effluent gas 54 with lean absorbent 90 at absorption temperature effective to remove hydrogen sulfide and carbon dioxide.

In this FIG. 2, as in FIG. 1, the cooling section 6 is positioned above the hydrolysis section 4, with the chimney tray 60 positioned between the upper zone 14 of the hydrolysis column 12 and the lower zone 46 of the cooling column 42.

The absorption section 8 is positioned above the cooling section 6 and comprises an absorption column 82 having an upper zone 84 and a lower zone 86 and a plurality of trays 88 within the absorption column 82. The trays 88 comprise gas-to-absorbent contactors 20, weirs 22 and absorbent downcomers 24. A lean absorbent 90 feed means 92 is positioned in the upper zone 84 of the absorption column 82 and a product gas 96 withdrawal means 98 is positioned in the upper zone 84 of the absorption column 82.

In this FIG. 2, cooling section 6 effluent gas 54 is recovered as product gas 96 by cooling same to a temperature sufficiently cool to permit absorption of hydrogen sulfide and carbon dioxide by absorbent 90 and removing at least a portion of the carbon dioxide and hydrogen sulfide from such gas 54. The cooling section effluent gas 54 can be cooled by cool absorbent 40 or a combination of cool absorbent 40 and lean absorbent streams 90 or 91, or a combination of lean absorbent streams 90 and 91.

In one variation as shown in FIG. 2, lean aqueous absorbent 90 having a concentration of hydrogen sulfide or carbon dioxide less than the cool aqueous absorbent 40 is contacted with the cooling section effluent gas 54 in the 8 absorption section to remove at least a portion of the carbon dioxide and hydrogen sulfide contained in the cooling section effluent gas 54 and to form enriched lean aqueous absorbent 56 which is passed from the absorption section 8 to the cooling section 6 wherein the enriched lean aqueous absorbent 56 is admixed with the cool aqueous absorbent 40 and 50 on the trays 48 of the cooling column 42 to form an absorbent mixture which is contacted with the hydrolysis section effluent gas 36 in the cooling column 42 to remove at least a portion of the carbon dioxide and hydrogen sulfide contained in the hydrolysis section effluent gas 36.

In another variation as shown, lean aqueous absorbent 91 having a concentration of hydrogen sulfide or carbon dioxide less than cool aqueous absorbent 40 is added to the cooling section 6 to form a mixture 50 of lean aqueous absorbent 91 and cool aqueous absorbent 40 and the hydrolysis section effluent gas 36 is cooled and contacted by the mixture 50 of 40 and 91 to remove at least a portion of the carbon dioxide and hydrogen sulfide contained in the hydrolysis section effluent gas 36.

While the invention has been described in conjunction with presently preferred embodiments, it is obviously not limited thereto. For example, those skilled in the art understand that the hydrolysis section may be a separate vessel apart from the cooling section which may be a separate vessel.

We claim:

1. An apparatus for treating hydrocarbon gas containing carbonyl sulfide with hot aqueous absorbent at hydrolysis reaction temperature for hydrolysis of carbonyl sulfide to carbon dioxide and hydrogen sulfide and formation of hydrolysis product gas, and for cooling said hydrolysis product gas with cool absorbent at cooling temperature, said apparatus comprising:

a. a hydrolysis section, comprising a hydrolysis column having an upper and lower zone and a plurality of trays within said hydrolysis column, said trays comprising gas-to-absorbent contactors, weirs, and absorbent downcomers, a hydrocarbon gas feed conduit positioned in said lower zone of said hydrolysis column, a hot aqueous absorbent feed conduit positioned in said upper zone of said hydrolysis column, and a withdrawal conduit to withdraw absorbent from said lower zone of said hydrolysis column;
   b. a cooling section, positioned above said hydrolysis section, comprising a cooling column having an upper and lower zone and a plurality of trays within said cooling column, said trays comprising gas-to-absorbent contactors, weirs, and absorbent downcomers, and a cool product gas withdrawal conduit positioned in said upper zone of said cooling column;
   c. a chimney tray positioned below said lower zone of said cooling section an above said upper zone of said hydrolysis section, said chimney tray separating absorbent of said cooling section from absorbent of said hydrolysis section and comprising a pan base adapted to collect absorbent from said lower zone of said cooling column, a chimney riser adapted to pass hydrolysis product gas from said top zone of said hydrolysis column to said lower zone of said cooling column without passing said hydrolysis product gas through said absorbent on said pan base, and a withdrawal conduit adapted to withdraw absorbent from said pan base;
   d. a heater to heat said absorbent withdrawn from said pan base to hot aqueous absorbent at hydrolysis reaction temperature;
   e. a cooler to cool said absorbent withdrawn from said hydrolysis section to form cool absorbent at cooling temperature;
   f. a conduit to direct said hot aqueous absorbent to said hydrolysis section; and
   g. a conduit to direct said cool absorbent at cooling temperature to said cooling section.

2. An apparatus for treating hydrocarbon gas containing carbonyl sulfide with hot aqueous absorbent at hydrolysis reaction temperature for hydrolysis of carbonyl sulfide to carbon dioxide and hydrogen sulfide and formation of hydrolysis product gas, for cooling said hydrolysis product gas with cool absorbent at cooling temperature, and for product gas recovery by absorption of hydrogen sulfide and carbon dioxide from said cool hydrolysis product gas with lean absorbent at absorption temperature, said apparatus comprising:

a. a hydrolysis section, comprising a hydrolysis column having an upper and lower zone and a plurality of trays within said hydrolysis column, said trays comprising gas-to-absorbent contactors, weirs, and absorbent downcomers, a hydrocarbon gas feed conduit positioned in said lower zone of said hydrolysis column, a hot aqueous absorbent feed conduit positioned in said upper zone of said hydrolysis column, and a withdrawal conduit to withdraw absorbent from said lower zone of said hydrolysis column;
   b. a cooling section, positioned above said hydrolysis section, comprising a cooling column having an upper and lower zone and a plurality of trays within said cooling column, said trays comprising gas-to-absorbent contactors, weirs, and absorbent downcomers;
   c. a chimney tray positioned below said lower zone of said cooling section and above said upper zone of said hydrolysis section, said chimney tray separating absorbent of said cooling section from absorbent of said hydrolysis section and comprising a pan base adapted to collect absorbent from said lower zone of said cooling column, a chimney riser adapted to pass hydrolysis product gas from said top zone of said hydrolysis column to said lower zone of said cooling column without passing said hydrolysis product gas through said absorbent on said pan base, and a withdrawal conduit adapted to withdraw absorbent from said pan base;
   d. an absorption section, positioned above said cooling section, comprising an absorption column having an upper and lower zone and a plurality of trays within said absorption column, said trays comprising gas-to-absorbent contactors, weirs and absorbent downcomers, a lean absorbent feed conduit positioned in said upper zone of said absorption column and a product gas withdrawal conduit positioned in said upper zone of said absorption column;
   e. a heater to heat said absorbent withdrawn from said pan base to hot aqueous absorbent at hydrolysis reaction temperature;

f. a cooling to cool said absorbent withdrawn from said hydrolysis section to form cool absorbent at cooling temperature;
g. a conduit to direct said hot aqueous absorbent to said hydrolysis section; and
h. a conduit to direct said cool absorbent at cooling temperature to said cooling section.

3. An apparatus for treating hydrocarbon gas containing carbonyl sulfide to reduce the concentration of carbonyl sulfide in said hydrocarbon gas, said apparatus comprising:

a. a hydrolysis section, for contacting said hydrocarbon gas with hot aqueous absorbent, comprising a column and plurality of trays with said column, said trays comprising vapor-to-liquid contactors to contact and heat ascending hydrocarbon gas with descending hot aqueous absorbent for a contact period in the range of about 35 to about 75 seconds and at a reaction temperature in the range of about 180° F. to about 210° F. to form ascending hydrolysis section effluent gas and descending hydrolysis section effluent absorbent;
b. a feed conduit for feeding said hydrocarbon gas to said hydrolysis section at a pressure in the range of about 50 to about 100 psia and at a temperature in the range of about 100° F. to about 120° F.;
c. a cooling section, positioned above said hydrolysis section, for contacting said hydrolysis section effluent gas with cool aqueous absorbent, comprising a column and a plurality of trays within said column, said trays comprising vapor-to-liquid contactors to contact and cool ascending hydrolysis section effluent gas with descending cool aqueous absorbent to form warm absorbent and cooling section effluent gas;
d. a chimney tray positioned below said cooling section and above said hydrolysis section, said chimney tray separating absorbent of said cooling section from absorbent of said hydrolysis section and comprising a pan base adapted to collect warm absorbent, a chimney riser adapted to pass hydrolysis section effluent gas from said hydrolysis section to said cooling section without passing said hydrolysis section effluent gas through said warm absorbent on said pan base, and a withdrawal conduit adapted to withdraw warm absorbent from said pan base;
e. a heater to heat said withdrawn warm absorbent to form hot absorbent;
f. a conduit to direct said hot absorbent to said hydrolysis section;
g. a cooler to cool said hydrolysis section effluent absorbent to form cool said absorbent;
h. a conduit to direct said cool aqueous absorbent to said cooling section;
i. an absorption section, positioned above said cooling section, for contacting cooling section effluent gas with lean absorbent, comprising a column and a plurality of trays within said column, said trays comprising vapor-to-liquid contactor to contact ascending cooling section gas with descending lean absorbent to pass said lean absorbent to said cooling section and to form a product gas; and,
j. withdrawal conduit for withdrawing said product gas from said absorption section.

* * * * *